United States Patent
Evans et al.

[11] Patent Number: 5,995,451
[45] Date of Patent: Nov. 30, 1999

[54] MULTIPLE SENSOR FISH SURROGATE INTERFACE SYSTEM FOR ACOUSTIC AND HYDRAULIC DATA COLLECTION AND ANALYSIS

[75] Inventors: James G. Evans, Talluleh, La.; Falih H. Ahmad, Clinton, Miss.; Richard Wayne Haskins, Raymond, Miss.; John M. Nestler, Vicksburg, Miss.

[73] Assignee: The United States of America as represented by the U.S. Army Corps of Engineers as represented by Secretary of the Army, Washington, D.C.

[21] Appl. No.: 08/583,172

[22] Filed: Jan. 4, 1996

[51] Int. Cl.$^6$ ..................................................... H04B 1/02
[52] U.S. Cl. ..................... 367/139; 367/191; 367/173; 367/153
[58] Field of Search ................................ 367/139, 135, 367/149, 13, 153, 191, 173; 119/174; 43/1, 4

[56] References Cited

U.S. PATENT DOCUMENTS

| 4,932,007 | 6/1990 | Suomala | 367/139 |
| 5,177,891 | 1/1993 | Holt | 43/17.1 |
| 5,412,622 | 5/1995 | Pauer et al. | 367/154 |

*Primary Examiner*—Daniel T. Pihulic
*Attorney, Agent, or Firm*—Luther A. Marsh

[57] ABSTRACT

The invention is a processor based analysis system with appropriate interface that includes multiple fish surrogates that each have a plurality of piezoelectric and triaxial accelerometer sensors for emulating sensory organs of a particular fish. The multiple fish surrogate array is immersed in flowing water intakes of a hydraulic structures such as intakes, intake bypasses, and diversion structures, and natural geological formation such as riffles, shoal areas, and pools. The invention is an interface system for data acquisition analysis and perspective display of acoustic and fluid dynamic data in or near these hydraulic structures and/or natural formations. To accomplish this, multiple sensors in each of the fish-shaped surrogate physical enclosures that form the array are deployed at the same time to describe a fish's aquatic environment at the hydraulic structure location. The gathered data can then be correlated with fish behavior for the purpose of developing methods of diverting fish from such areas of danger of a water intake or to attract them to a water bypass entrance system.

10 Claims, 3 Drawing Sheets

MULTIPLE SENSOR FISH SURROGATE INTERFACE SYSTEM FOR ACOUSTIC AND HYDRAULIC DATA COLLECTION AND ANALYSIS

STATEMENT OF GOVERNMENT INTEREST

The invention described herein may be manufactured and used by or for the United States Government for governmental purposes without the payment of any royalties thereon.

FIELD OF THE INVENTION

The invention pertains to an apparatus for analyzing hydroacoustic and hydraulic pressure variations at water intakes in relationship to fish behavior. More specifically, it relates to a processor interface system for an apparatus simulating multiple acoustic or flow sensory elements or systems of a specific fish under study. Such a system characterizes acoustic signals and hydraulic pressure variations for correlation with fish movement towards, or away from, these water intake structures that are potentially hazardous to these fish. The invention can also describe complex flow patterns in natural aquatic settings or manmade hydraulic structures.

BACKGROUND OF THE INVENTION

Many valuable fish species are in serious decline, requiring human intervention to prevent further decline and extinction. Such intervention includes the use of apparatus and methods for diverting or repelling fish away from zones of danger caused by man made structures, such as the intakes of hydroelectric power turbines, or the intakes of pumping stations used on lakes for off-peak hours that pump water from the low side of the hydroelectric power dam to the upstream reservoir, or the intakes catching fish. For example, U.S. Pat. No. 5,177,891 entitled "Game Fish Attracting Device" by Holt teaches of a game fish luring device that is capable of generating multiple acoustic signatures for attracting a particular fish. Moreover, this teaching discloses well known means of obtaining underwater acoustic signatures using standard underwater acoustic apparatus. However, this teaching does not suggest or teach of either a means or method for recording accurate hydroacoustic or hydraulic flow data that a fish's sensory organs experience at a water inlet.

Previous fish behavioral studies have been based on assumptions that sound field emanations influence a fish's movement and could be represented by mathematical models based on an acoustic field of simple sources such as dipoles and monopoles. Generally, these studies have dealt with only a compressional wave component of a sound field that does not include an actual particle motion component. Such studies do not adequately describe the sound field that influences a fish's behavior, especially in areas of high turbulence. Fish have a very important sensory organ referred to as the lateral line which contains hair cells that transduce mechanical hair motion caused by these types of pressure differences and particle motion experienced at a water inlet into neuroelectrical impulses. The function of this important sensory organ is not taken into account by methods known in the technical arts of environmental studies. Moreover, the sensors are incorporated into the body of a fish being studied wherein the fish closely resembles an actual fish that minimizes extraneous flow induced noise that would otherwise would be encountered if a regular hydrophone were used. Thus, the instant invention's sensory fish surrogate is a means for collecting and analyzing through a processor interface relevant acoustical/hydraulic data that can assist in the design of a water inlet that will deter fish from such a water inlet. Alternatively, the invention can be used to collect and analyze acoustical/hydraulic data to attract fish to the entrances of fish bypass systems.

SUMMARY OF THE INVENTION

The invention is a processor based analysis system with an interface system for a multiple fish surrogate array. Each surrogate fish has a plurality of piezoelectric and triaxial accelerometer sensors for emulating sensory organs of a particular fish. The multiple fish surrogate array is immersed in flowing water intakes of a hydraulic structure such as intakes, intake bypasses, diversion structures or natural geological formation such as riffles, shoal areas, and pools. The invention is an interface system for data acquisition analysis and display of acoustic and fluid dynamic data in or near these hydraulic structures and natural formations. To accomplish this, multiple sensors in each fish-shaped physical enclosure that form the array are deployed at the same time to describe a fish's aquatic environment at water intake locations under examination. Since such an intake exhibits turbulent flow fields that cannot be characterized by a single sensor, many sensor bodies are required for a thorough characterization of the water intake. This collected data can then be correlated with the fish behavior under study for developing methods of diverting fish from these water intake areas of danger or attracting these fish to a water bypass entrance system. Similarly, The invention can also describe complex flow patterns in natural aquatic settings or man-made hydraulic structures.

DETAILED DESCRIPTION OF THE INVENTION

Figure 1A:
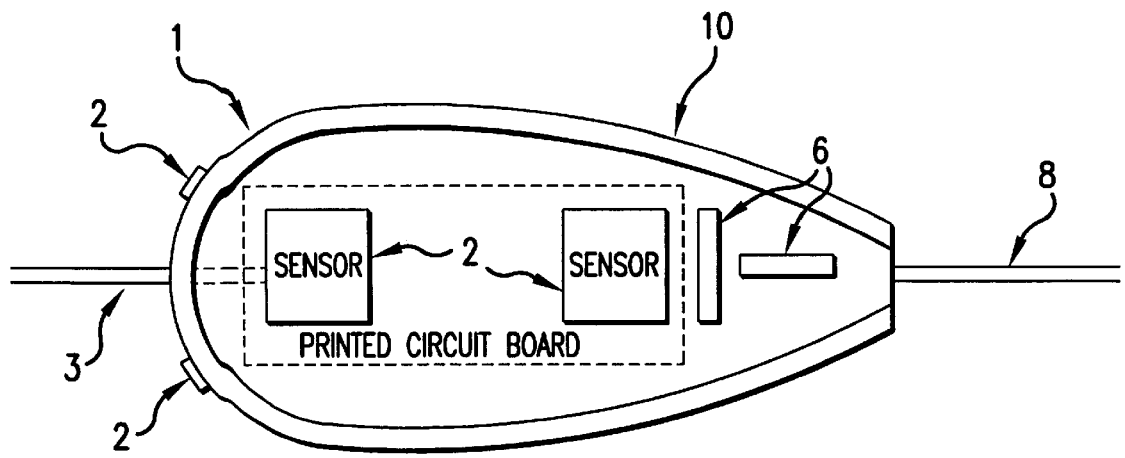
FIG. 1a shows an assembly drawing of the fish surrogate including optical fiber network and stabilizer line.

FIG. 1a is an illustration of a single fish surrogate used in the instant invention. It is similarly shown and described in i) U.S. patent application Ser. No. 08/364,919, now U.S. Pat. No. 5,517,465, entitled "Multiple Sensor Fish Surrogate for Acoustic and Hydraulic Data Collection" and ii) U.S. patent application Ser. No. 08/502,025 entitled "Multiple Sensor Fish Surrogate for Acoustic and Hydraulic Data Collection" which are hereby incorporated by reference. However, the instant invention includes additional processor interface system components for calibrating the array and the analysis and display of the collected data.

Figure 1B:
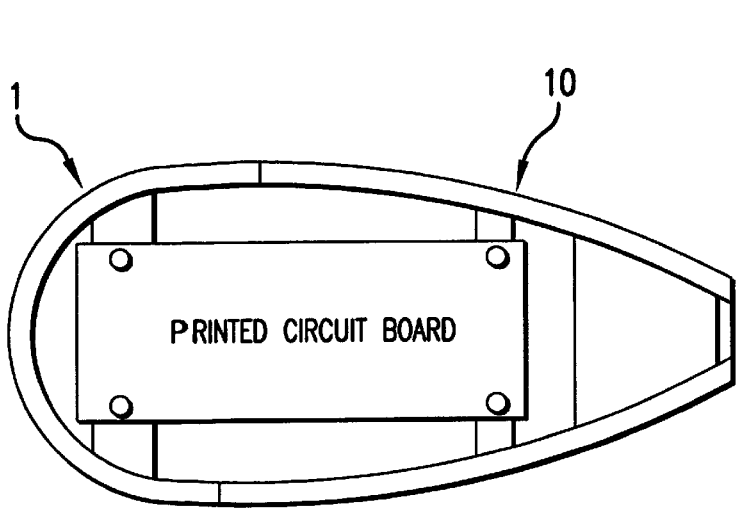
FIG. 1b shows an assembly drawing of the fish surrogates of this invention indicating position of printed circuit board.
Figure 1C:
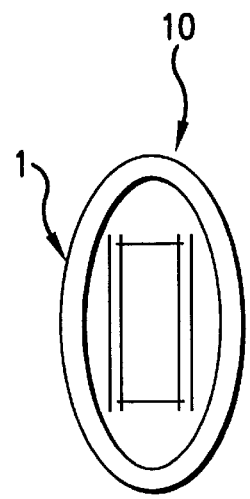
FIG. 1c shows an a cross-sectional view of FIG. 1b.

Each fish surrogate (10) as shown in FIG. 1b comprises a hollow enclosure (1) having an approximate size and shape of the fish under study at a location of particular interest. Fiberglass reinforced epoxy or polyester resins are the preferred materials for constructing the hollow enclosure of the fish surrogate. Other materials may be used provided they seal the fish surrogate's enclosure against water intrusion. A plurality of piezoelectric sensors (2), ranging in numbers are mounted on the exterior surface of the fish surrogate (10) enclosure as shown in FIG. 1b at locations corresponding to sensory areas on an actual fish under study. Each fish has a stabilizer line (8). Thus, several such sensors can be located on areas corresponding to the fish's head.

The output signals of these sensors (2) & (6) of FIG. 1a of each fish surrogate (10) pass wires and optical leads through the interior of the surrogate fish (10) enclosure as shown in FIG. 1b, being properly sealed against water leakage. The optical and power leads in turn passes through a water tight connection (3) from the enclosure. These leads are connected to a supporting frame that supports the plurality of fish surrogates (10). These leads form a harness (20) that transmits sensory output data.

Figure 2:
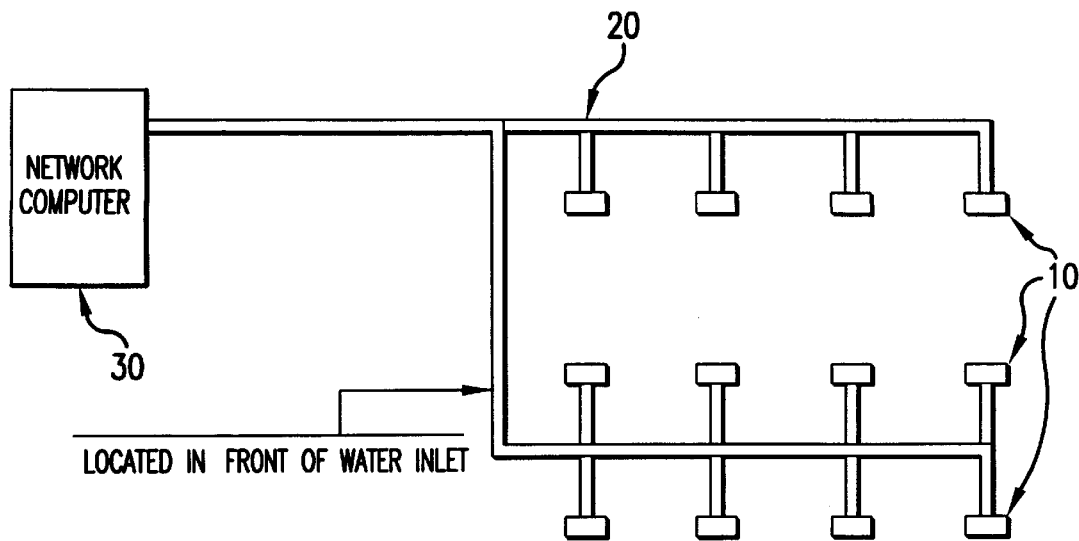
FIG. 2 shows a schematic view of several of the fish surrogates of this invention for deployment at a water intake.
Figure 3:
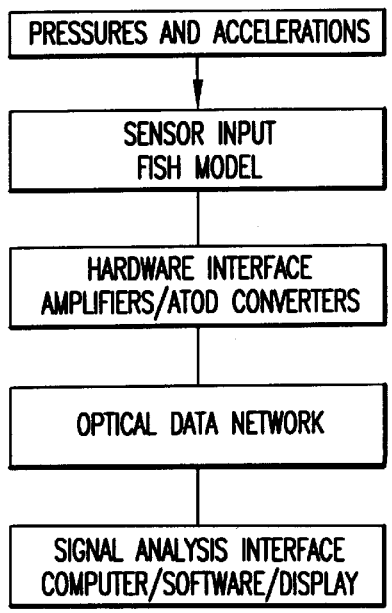
FIG. 3 shows a signal flow block diagram of one of the fish surrogates of this invention.

The signals recorded during test runs, during which the multiple fish surrogates (10) as shown in FIG. 1b are immersed in water, may be analyzed and displayed as needed by central processing unit (30). The system of the instant invention as shown in FIG. 2 and FIG. 3 has multiple fish surrogates (10) that are interconnected to the power & optical fiber harness (20) to the master central processing unit (30). The network allows for high speed data transmissions between the central processing unit (30) and the individual fish surrogate (10). Data can be retrieved from any of the multiple fish surrogates (10), for example, as many as 256 such units, at a rate of several thousand bytes per second. Since many water intake structures are hydroelectric in nature, the preferred data transmission link of the harness (20) is a fiber optic cable which prevents the electromagnetic interference due to the hydroelectric generators which may interfere with data acquired by the system. Power is supplied to the fish sensors using electrical wire.

The instant invention can use an arcnet network. The arcnet network is characterized by a token bus protocol with up to 255 nodes. The network interface provides both network management and fault isolation. The network further includes a self diagnostic capability where duplicate node ID detection and fault isolation are used. Each data packet may contain up to 512 bytes. Data rates may he from 156 Kbs to 5 Mbs. Data transmissions from the fish surrogates (10) can be accomplished via the fiber optic transmission link that is consist of a star topology.

Typically, the fish surrogate (10) has eight analog channels located within the device. Five of the eight channels are passive by design and the other three have provisions for a 12 volt power source. The system has the capability of performing 16 bit digitization of all input channels. The digitization rate is 100,000 samples per second.

The operation of the system is as follows: The master central processing unit (30) can initiate commands to the fish surrogate (10). Each fish surrogate (10) has a specific identification byte (IDF byte) that will respond to a data request contained in its identification. In addition each sensor in each fish surrogate (10) has a specific identification byte IDS byte which will be forwarded to the master central processing unit (30) from one of the fish surrogates (10). Each fish surrogate (10) has a microcontroller which can decode commands from the master central processing unit (30) and respond according to that command to: i) send a signal from a specific fish and channel; ii) send all signals from the multiple channels from a specific fish surrogate; iii) send signals from a desired channel of selected fish surrogate; and iv) preform diagnostic of an individual surrogate.

In addition to the data, the fish surrogate (10) will also send the fish IDF and sensor IDS, the amplifier gain byte and the data status byte. Once the data is received by the central processing unit, It may be stored on disk or displayed by the central processing unit (30) in real time depending on the request of operator. The fish surrogate (10) has a microcontroller with selectable three decades of amplifier gain. The digitized data are maintained within the center range of the gain range, if the data is outside the center of the gain range the gain is changed to be within the acceptable gain range which is determined by the microcontroller. The data is inspected by the microcontroller continuously after conversion by the analog to digital converter. If the microcontroller cannot find a range where data is within a center range gain level, a data corrupt byte is sent along with the data. If the data is within an acceptable data range, the corrupt byte is zero. The display output of the system can show an analog representation of digital signals in real-time sequentially. Several channels can be displayed in any sequence on the terminal at one time.

CALIBRATION

The sensory elements (2) & (6) of each fish surrogate (10) in the array are calibrated individually to determine their directional and frequency response to both compressional and shear forces. Calibration can take place in air and/or underwater. Dual reciprocity and comparison methods using standard transducers and calibrated signal generators can be used. Calibration factors required to equalize the frequency and time domain output from the various discrete sensors in the fish surrogate (10) array will be input via a calibration input table accessible to the system operator via a menu selection of master central processing unit (30). Various factors are applied to received sensed analog signals at the initial stages of data input signal processing. Calibration may be achieved using several means. One such method is a function generator and a speaker along with a sound pressure level meter. Another method is calibration of the MSFS system in a fluid environment. By inserting the fish surrogate in a known flow rate fluid field stream, the individual sensors on each fish can be calibrated by rotating the fish body along a 360° axis and making calibration tables for each sensor output at various angles related to a particular flow direction.

Figure 4:
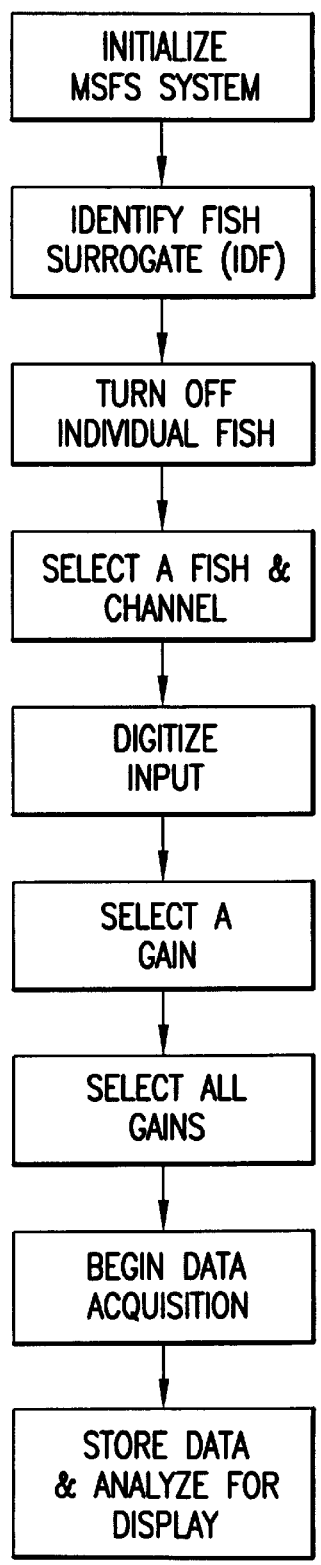
FIG. 4 shows a flow chart of the methodology of the interface system.

FIG. 4 illustrates the methodology of the interface system for data acquisition purposes. These steps include:

1) Starting the program by initializing the MSFS system.
2) Identify each fish fish surrogate (10) using the IDF.
3) Turn off each fish surrogate (10) by sending a clear IDF.
4) Turn on a channel in a particular fish surrogate (10) by sending a gainset command, channel number, and IDF signal.
5) Digitize the input signal for storage in the personal computer that correlates with the particular fish surrogate (10).
6) Set an analog amplifier at a point where the gain is near the gain center, i.e. a command internal to each fish surrogate (10), digitize, center and redigitize 5 times to average the center).
7) Turn the other channels one at a time and set the gain as near the center of the reading as possible.
8) Repeat this for each fish surrogate (10) over each channel.
9) An IDF "send" command for a particular fish can then be sent.

10) The acquired data is then stored for further data analysis.

SYSTEM INTERFACE HARDWARE

The system hardware can autonomous of manually controlled by the system operator using features of the system's processor based control station (30). Typically this is a personal computer. Interface to the various hardware elements will be through a library of software drivers for the individual hardware components. The software drivers include video, printer, mouse, joystick, pointer and plotter types. The interface between the multiple fish surrogates (10) and the user consists of a data acquisition system and a method of storing, analyzing, and displaying the data. The multiple fish surrogates (10) data consists of both particle velocity and acoustic pressure components of the hydrodynamic field generated by one or more simple or complex sources. These signals are analog in nature and are acquired using analog methods. Once the data are acquired, a sample of the signal can be digitized using a (12–16 bit) analog-to-digital (A/D) converter while the sensed analog data can be stored for later analysis. Processing of the sampled analog data signals in the time domain allows characterization by frequency domain analysis. Further processing using signals from two or more spatially distinct piezoelectric sensors of the multiple fish surrogates (10) permits descriptions of other characteristics of the hydrodynamic field generated by contributing sources and in this manner, inference about the nature of the source(s). A high speed A/D converter (over 1 MHz) can resolve the particle motion to within a few degrees. This enables the user to view the particle motion as it moves past the sensor cells of each fish surrogate (10) in its rotational velocity as well as its transverse velocity.

In cases where the gain of the amplifiers will be distorted due to the dynamic nature of the stimuli (particle motion and compressional forces), the amplifier gain must be controllable either by automatic or manual means, so that the input to the A/D converter is not distorted due to saturation of the analog amplifiers. In some applications, the interface system herein permits the operator to set a threshold that the strength of the received signal must exceed before processing will occur. This threshold is set by the operator entering a signal level into a dialog box that is enabled when the operator selects an option function in an operating menu for imposing a threshold limit on signal processing of a received signal.

A. Data Acquisition

The data acquisition system comprises either a single or multi-sensor arrangement of the fish surrogates (10). These sensors may be operated singular or in parallel with other strategically placed sensors of the fish surrogates (10), a multi-channel impedance translator, a multi-channel interconnect assembly (transfers the signal from the system/amplifier to the data analyzing system). The transmission media (20) can be ultrasonics, wire or fiber optics. Additional multi-channel amplification, as well as multi-channel attenuation may be required to transmit the data in its best signal-to-noise ratio range.

B. Data Storage

The data can be analyzed in real time and/or stored for later analysis using, a non-volatile storage media. A digital tape drive may be used where extended periods of time are required. Since the data is analog in nature, it can be stored in analog form using an audio tape drive. In all cases, multiple channels of data are involved; therefore, the storage either must be multiplexed or multiple channels of data storage are required.

Software control of the system will be accomplished using an object oriented programming language capable of operating in a multi-tasking environment such as Visual Basic® running within a Windows® based operating system. The interface system can be a visual menu driven using standard protocols for programming language and desired operating environment.

C. Data Processing and Analysis

This includes commercially developed software capable of complex high speed processing of built-in and user defined functions. Examples of such developed software include Matlab® and MathCad®. The compressional and translational data form the fish surrogates (10) is processed by high level processing functions such as transforms, filters, and neural networks. By being both a high end programming language and processing system, processing and analysis functions that are more simple or loop oriented is compatible with Visual Basic®.

D. Data Visualization

A variety of data display strategies and technologies may be used to display the data. Both the compressional and transverse forces may be displayed in time and/or frequency domain. Three-dimensional perspective, computer-based display will be implemented using various technologies, including parallax based methods. An important feature of data output display includes using a signal processing analysis that permits three dimensional perspective of the particle motion and acoustic pressure components of the hydrodynamic field impinging on the sensor array. Other methods such as 3D visualization goggles can be used to give the user a three dimensional sensation of forces that interact on the fish surrogate models (10).

While this invention has been described in terms of a preferred embodiment, it is understood that it is capable of further modification and adaptation of the invention following in general the principle of the invention and including such departures from the present disclosure as come within the known or customary practice in the art to which the invention pertains and may be applied to the central features set forth, and fall within the scope of the invention and the appended claims.

We claim:

1. An apparatus for characterizing acoustic signals and pressure variations in hydraulic inlet structures in relationship to a fish's behavior at such locations comprising:

(a) multiple hollow fish surrogate enclosures corresponding in size and shape to the fish under study;

(b) each surrogate fish has a plurality of piezoelectric sensors mounted on the exterior of the enclosure and a plurality of triaxial accelerometers mounted within;

(c) each surrogate fish has power and data transmission means connected to an electronic circuit board, that in turn, connect to the sensors for transmitting output signals from the piezoelectric and accelerometer sensors, the power and data transmission means pass through a water-tight connection of each enclosure;

(d) each surrogate fish has a supporting means affixed to each surrogate enclosure that forms an array, the supporting means provides a data transmission pathway from each fish surrogate, that in turn, connects to an electronic central processing interface unit through a means for digital-to analog signal conversion; and (e) the electronic central processing interface unit including: i) a means for calibration of each surrogate fish in the array, ii) a means for data processing and analysis, iii) a means for visualization of both compressional and transverse forces experienced by each surrogate fish, and iv) a means for recording acoustic signals sensed by each surrogate fish.

2. The apparatus of claim 1 wherein the means for visualization of both compressional and transverse forces experienced by each surrogate fish is a display with a real-time output format.

3. The apparatus of claim 1 wherein the means for visualization of both compressional and transverse forces experienced by each surrogate fish is a display with a frequency domain output format.

4. The apparatus of claim 1 wherein the means for visualization of both compressional and transverse forces experienced by each surrogate fish is a display with three dimensional perspective of the particle motion and acoustic pressure components of the hydrodynamic field impinging on the fish surrogate array.

5. The apparatus of claim 1 wherein the data transmission means is an optical fiber link.

6. The apparatus of claim 1 wherein the circuit board includes a microcontroller which decodes commands from the electronic central processing unit and the microcontroller responds according to a command to: i) send a data signal from a particular sensor from an addressed surrogate fish; ii) send all data signals from the specific fish surrogate; iii) send signals from a desired channel of selected fish surrogate; and iv) perform diagnostics of the surrogate fish.

7. The apparatus of claim 5 wherein the data transmission means is a network between the central processing unit and individual fish surrogates is a star network.

8. The apparatus of claim 5 wherein the data transmission means is a network between the central processing unit and individual fish surrogates is an arcnet network.

9. The apparatus of claim 1 wherein the means for data processing and analysis of the electronic central processing interface unit including high speed data processing methodology of the compressional and translational data from each fish surrogates by using mathematical transforms, filters, and neural networks.

10. The apparatus of claim 1 wherein the digital-to analog signal conversion means includes a multi-channel impedance translator with a multi-channel interconnect assembly.

* * * * *